United States Patent [19]

Shibata

[11] 4,432,487

[45] * Feb. 21, 1984

[54] METHOD OF OVERLAYING STAINLESS STEEL MATERIAL FOR DECORATIVE ARTICLES AND ORNAMENTS WITH A PRECIOUS METAL ALLOY

[75] Inventor: Akira Shibata, Yokohama, Japan

[73] Assignee: Chugai Denki Kogyo Kabushiki, Kaisha, Japan

[*] Notice: The portion of the term of this patent subsequent to Jan. 5, 1999 has been disclaimed.

[21] Appl. No.: 340,484

[22] Filed: Jan. 18, 1982

[51] Int. Cl.$^3$ ............................................. B23K 20/00
[52] U.S. Cl. ............................. 228/194; 228/263.16; 427/383.9; 204/37 R
[58] Field of Search ........................... 204/37 R, 18.1; 427/259, 46, 261, 383.9; 228/193, 194, 263.16

[56] References Cited

U.S. PATENT DOCUMENTS 3,251,121  5/1966  Prival ............................... 204/37 R
3,698,880  10/1972  Koons et al. ..................... 204/37 R
4,309,461  1/1982  Shibata ............................. 204/37 R

*Primary Examiner*—Sam Silverberg
*Attorney, Agent, or Firm*—Shlesinger, Fitzsimmons & Shlesinger

[57] ABSTRACT

In order to overlay a stainless steel material for decorative articles and ornaments with a precious metal alloy, a comparatively thin layer of said alloy or a plurality of constituent thin layers of said alloy are overlaid on a selected surface of said stainless steel and heated to a temperature higher than 800° C. for the diffusion bonding of said layer or layers to the stainless body and for annealing of said body, and thereafter another thicker layer or constituent layers of a precious metal alloy are overlaid on the stainless steel material with or without heating said second-mentioned layer or layers.

3 Claims, No Drawings

METHOD OF OVERLAYING STAINLESS STEEL MATERIAL FOR DECORATIVE ARTICLES AND ORNAMENTS WITH A PRECIOUS METAL ALLOY

BACKGROUND OF THE INVENTION

This invention relates to a method of overlaying a stainless steel material for decorative articles and ornaments with an alloy of Au, Pt, and/or Pd bases.

The present inventor has invented a method of the above-mentioned kind, and filed U.S. patent application Ser. No. 150,190 of May 15, 1980, now U.S. Pat. No. 4,309,461 in which there is described a method of overlaying an austenite stainless steel material for decorative articles and ornaments with an alloy of Au, Pt, and/or Pd bases, which comprises plating selected surfaces of the steel material with the constituents of said alloy in any desired order, and one at a time in a plurality of successive layers, and with each layer being of a thickness and volume which corresponds to the constituent ratios of the alloy of a desired purity and dimension, and heating the layers to a temperature sufficient to cause them to liquid phase alloy.

It is now found by him that the alloy of Au, Pt, and/or Pd bases which is overlaid on an ingot stainless steel material for fabricating decorative articles and ornaments such as spectacle frames, watch casings, and watch bracelets by the aforementioned method, does not sometimes present the colour it originally shall have, when the steel material overlaid with the alloy is subjected to a temperature which causes it to liquid phase alloy, viz., a temperature higher than 800° C. This is because that when an alloy of the aforementioned kind is heated to a temperature higher than 800° C., its diffusion into the stainless steel occurs, while constituents of stainless steel such as Fe, Cr, Ni and others which are activated by Au, Pd and/or Pt under an elevated temperature come up into the alloy, too. Their diffusion itself is advantageous for the firm diffusion bonding between the stainless steel matrix and the overlaid precious metal alloy, but it disadvantageously discolors said alloy. Annealing is often required for a stainless steel material either of austenite or ferrite to have its work hardening lessened or released. Unless annealing is made in case of stainless steel matrices overlaid by a precious metal alloy, the alloy shall come off from the matrices when they are subjected to a bending test, because of the hardness of the matrices. If mild stainless steel materials which do not require annealing, are employed, they shall be very weak against sweat. Said annealing which is held at a temperature higher than 800° C. in case of austenite, ferrite or martensite stainless steel for increasing their workability is, however, accompanied also with the diffusion of Fe, Cr, Ni and other contents of stainless steel material into an alloy of Au, Pt and/or Pd bases, which diffusion discolors said alloy.

BRIEF SUMMARY OF THE INVENTION

In view of the above, this invention is to provide a novel method of overlaying a stainless steel material for decorative articles and ornaments with an alloy of Au, Pt, and/or Pd bases, in which the top layer of alloy shall not be discolored, firm duffusion bonding of alloy to the stainless steel matrix is secured, and the stainless steel matrix has good workability for being rolled or pressed.

In the method of this invention, a base or barrier thin layer or layers of an alloy of Au, Pt, and/or Pd bases are bonded upon a stainless steel matrix body and heated to a temperature higher than 800° C., and thereafter a thicker top layer or layers of an alloy of Au, Pt, and/or Pd bases are overlaid upon the base layer, whereby the discoloring of the top layer is prevented, and the base layer is firmly diffusion bonded to the stainless steel material while the said stainless steel is annealed so as to have a good workability.

DETAILED DESCRIPTION OF THE INVENTION

This invention is further explained in detail hereinunder with reference to the following embodiments.

EXAMPLE 1

A wire having a rectangular cross section of 4 mm in height and 4 mm in width of austenite stainless steel (SUS 316-L) was plated by layers of Au, Ag, and Cu applied individually to its upper half surfaces, while its lower half surfaces were masked. The total thickness of said layers was 2 micron, and their total constituent was correspondent to 2N-18 gold alloy, (viz., 75 weight % of Au, 15 weight % of Ag, and 10 weight % of Cu).

This wire was placed in a furnace of a hydrogen atmosphere of 950° C. for 5 minutes. The layers which were thus solidified into a single overlayer upon the stainless steel wire, presented a milky gold color. It was annealed. A microscopic examination and EDM analysis showed that about 5 to 10 percent of constituent elements of stainless steel material were diffued into the overlayer. The wire was semi-immersed to synthetic sweat of 50° C. for 7 days. No rust was produced.

Thus intermediately processed wire was cold-pressed by tandem rollers so that its height reduced to 3 mm, while the hardness of stainless steel raised from Hv. 170 to Hv. 280.

A total thickness of 9 micron of Au, Ag, and Cu layers, total constituent of which is correspondent to 2N-18 cold alloy, were then plated layer by layer over the wire. The wire was kept under vacuum $10^{-4}$ at 750° C. for one hour. The stainless steel had a hardness of Hv. 250, and its outer layer presented a brilliant golden colour. The wire was rolled so as to have a height of 2 mm. It was annealed at 750° C. for 3 minutes. Its hardness became Hv. 220.

This wire was subjected to tests of (1) twisting 180° for four times, (2) bending 90° with the plated surface up, and (3) immersing into synthetic sweat for 7 days at a room temperature. Results of the tests (1) and (2) showed no physical change of the wire, and the test (3) gave no rust.

EXAMPLE 2

The intermediately processed wire of Example 1 was press-bonded with a tape of 40 micron of 2N-18 gold alloy over its above-noted overlayer by passing it through a hydrogen atmosphere kept at 750° C. The wire was rolled so that its height was reduced to 1 mm in which the alloy layer amounted 10 micron, and thereafter annealed at 750° C.

This was subjected to the same tests of Example 1. Results were good as in Example 1.

What is claimed:

1. A method of overlaying a stainless steel material for decorative articles and ornaments with an alloy of Au, Pt, and/or Pd bases, which comprises plating selected surfaces of the steel material with the constituents of said alloy in any desired order, and one at a time in a plurality of successive layers, and with each layer being of a thickness and volume corresponding to the constituent ratios of the alloy of a desired purity and dimension, heating the plated layers to a temperature higher than 800° C. for effecting the diffusion bonding thereof, overlaying the plated layers with a layer of said alloy thicker than the combined thicknesses of said plated layers, and heating the resultant product at a temperature lower than 800° C.

2. A method as defined in claim 1, wherein said overlaying step comprises plating the constituents of said alloy layer by layer over the previously applied layers thereof.

3. A method as defined in claim 1, wherein said overlaying step comprises press-bonding a single layer or tape of said alloy over the previously applied layers thereof.

* * * * *